(12) United States Patent
Fieldhouse et al.

(10) Patent No.: US 7,242,922 B2
(45) Date of Patent: Jul. 10, 2007

(54) TOLL FREE CALLING ACCOUNT RECHARGE SYSTEM AND METHOD

(75) Inventors: Douglas M. Fieldhouse, Lake Oswego, OR (US); Kingsley R. Wick, Milwaukie, OR (US)

(73) Assignee: Vesta Corporation, Portland, OR (US)

( * ) Notice: Subject to any disclaimer, the term of this patent is extended or adjusted under 35 U.S.C. 154(b) by 746 days.

(21) Appl. No.: 10/032,900

(22) Filed: Dec. 26, 2001

(65) Prior Publication Data

US 2002/0119767 A1     Aug. 29, 2002

Related U.S. Application Data

(60) Provisional application No. 60/259,325, filed on Dec. 29, 2000, provisional application No. 60/259,541, filed on Jan. 2, 2001.

(51) Int. Cl.
    *H04M 11/00*     (2006.01)
(52) U.S. Cl. ................. 455/406; 455/408; 379/114.01; 379/230
(58) Field of Classification Search .............. 455/407, 455/408, 405, 406; 379/114.19, 114.2, 114.21, 379/114.17, 114.01, 230
    See application file for complete search history.

(56) References Cited

U.S. PATENT DOCUMENTS

| 5,812,945 A  * | 9/1998  | Hansen et al. ............... 455/403 |
| 6,084,951 A  * | 7/2000  | Smith et al. .............. 379/93.17 |
| 6,327,363 B1 * | 12/2001 | Henderson et al. ..... 379/265.01 |
| 6,430,406 B1 * | 8/2002  | Frisk .......................... 455/407 |
| 6,466,783 B2 * | 10/2002 | Dahm et al. ............. 455/414.2 |
| 6,487,401 B2 * | 11/2002 | Suryanarayana et al. ... 455/406 |
| 6,493,547 B1 * | 12/2002 | Raith ......................... 455/405 |
| 6,516,056 B1 * | 2/2003  | Justice et al. ............... 379/145 |
| 2003/0026404 A1* | 2/2003 | Joyce et al. ........... 379/144.01 |
| 2003/0048888 A1* | 3/2003 | Hopper et al. ........... 379/114.2 |
| 2003/0174823 A1* | 9/2003 | Justice et al. ............... 379/145 |
| 2006/0003736 A1* | 1/2006 | Chen et al. ................. 455/408 |

* cited by examiner

*Primary Examiner*—Binh K. Tieu
(74) *Attorney, Agent, or Firm*—Beyer Weaver LLP

(57) ABSTRACT

A calling account recharge system, method, and device are provided. The device has an associated stored-value calling account, and typically includes a selector, a communications program configured to communicate with a recharge service via a communication network, and a recharge option selectable by a user upon actuation of the selector. The recharge option is configured to cause the communications program to initiate a recharge transaction with the recharge service via the communication network, in order to add calling units to the stored-value calling account. The device may be configured to access the communication network via a toll-free gateway.

8 Claims, 9 Drawing Sheets

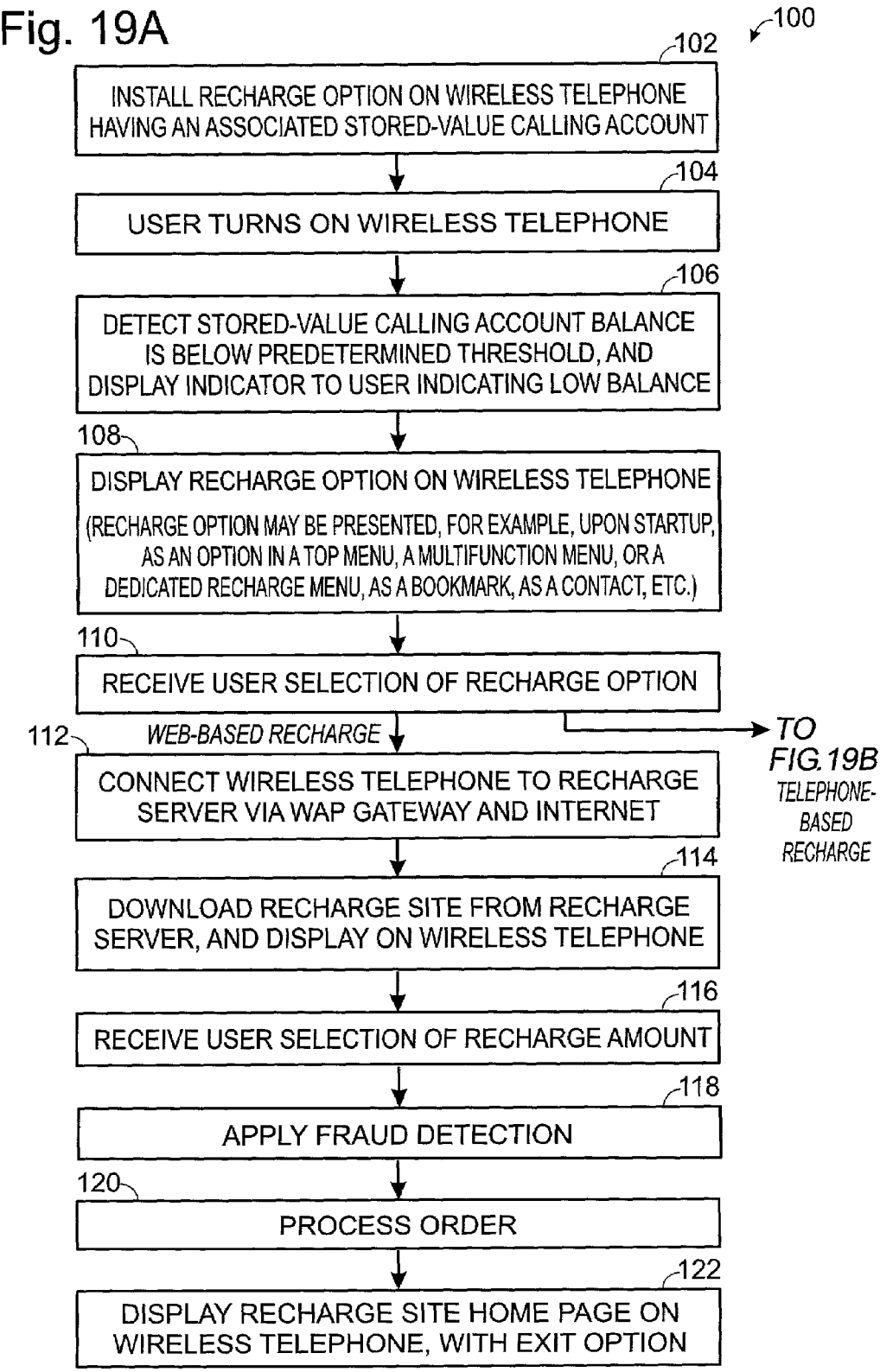

TOLL FREE CALLING ACCOUNT RECHARGE SYSTEM AND METHOD

CROSS-REFERENCE TO RELATED APPLICATIONS

This application is based upon and claims priority under 35 U.S.C. § 119(e) to the following U.S. provisional patent applications, the disclosure of each of which is incorporated herein by reference in its entirety for all purposes: Ser. No. 60/259,325 filed Dec. 29, 2000, and Ser. No. 60/259,541 filed Jan. 2, 2001.

FIELD OF THE INVENTION

The present invention relates generally to stored-value calling accounts and, more particularly, to a system and method for recharging a stored-value calling account.

BACKGROUND OF THE INVENTION

Stored-value calling accounts are used by a large number of telephone users to place calls around the world. In a typical scenario, a user purchases a wireless telephone linked to a stored-value calling account with a balance of, for example, $100 of calling units. The user may be given a plastic card containing an account number and pin, as well as a telephone number that the user may call to service the account. Such plans are typically commercially marketed under the label "PrePaid Wireless," and can be distinguished from conventional "post-paid" telephone plans.

As the user makes calls using the wireless telephone, calling units are deducted from the account. The deduction may be made either by software in the telephone itself, or by specialized telephone switching equipment configured to carry such pre-paid telephone calls. At the beginning of each outbound call, the user is typically prompted with a number of available minutes, or calling units. A warning tone may be emitted during a call if the account balance falls below a predetermined minimum threshold. If the account balance reaches zero, the current call will be disconnected and the user will be prevented from making further calls.

The user may add calling units to the account in a process referred to as "recharge." According to current recharge systems, recharge may occur in one of two ways. First, the user may visit a retail outlet of the wireless service provider or an authorized dealer and request that minutes be added to the stored-value account. Second the user may call the access number printed on the card discussed above, and request that a customer service representative add time to the account. However, the user must typically authorize dial-up recharge when opening the stored-value account. Where this option is not pre-authorized by the user, the user typically purchases a new stored-value card at a retail outlet, as discussed above.

Unfortunately, these current recharge methods are inconvenient for wireless telephone users. Traveling to a retail location or authorized dealer is time consuming and expensive. Calling a customer service representative is inconvenient because the user may be out of minutes on the wireless telephone. If so, the user will be forced to call the customer service representative from a different telephone. In addition, it is also difficult for the user to remember the access number of the customer service representative, and the telephone card containing the access number may become lost or difficult to locate. Based on the foregoing, alternative approaches for recharging a stored-value calling account are desirable.

SUMMARY OF THE INVENTION

A calling account recharge system, method, and device are provided. The device has an associated stored-value calling account, and typically includes a selector, a communications program configured to communicate with a recharge service via a communication network, and a recharge option selectable by a user upon actuation of the selector. The recharge option is configured to cause the communication program to initiate a recharge transaction with the recharge service via the communication network, in order to add calling units to the stored-value calling account.

According to another aspect of the invention, the device includes a user interface having a top menu, and a recharge option installed in the top menu. The recharge option is, upon selection, configured to initiate a recharge transaction, in order to add calling units to a stored value calling account associated with the wireless telephone device.

The method typically includes installing a recharge option in a wireless telephone device. The recharge option is configured to initiate a recharge transaction, in order to add calling units to a stored-value calling account associated with the wireless telephone device. The method further includes displaying the recharge option on the wireless telephone device, receiving a user selection of the recharge option, establishing communication with a recharge service via a communication network, and initiating the recharge transaction.

According to another aspect of the invention, the method includes detecting that a calling balance of a stored value calling account is lower than a predetermined threshold, and presenting a recharge option on a display of the device, the recharge option being configured to initiate a recharge transaction, in order to add calling units to the stored value calling account.

The system typically includes a recharge server connected to a communication network. The recharge server is configured to perform a recharge transaction on a stored-value telephone calling account. The recharge system also typically includes a web-enabled wireless telephone device having a recharge option installed thereon, the recharge option being selectable by a user upon actuation of a user input device on the wireless telephone device. The recharge option is further configured to cause a communication program on the wireless telephone device to initiate a recharge transaction with the recharge server via a communication network, in order to add calling units to the stored-value calling account.

BRIEF DESCRIPTION OF THE DRAWINGS

FIG. 19A is a flowchart of a method according to one embodiment of the present invention.

DETAILED DESCRIPTION OF THE INVENTION

Figure 1:
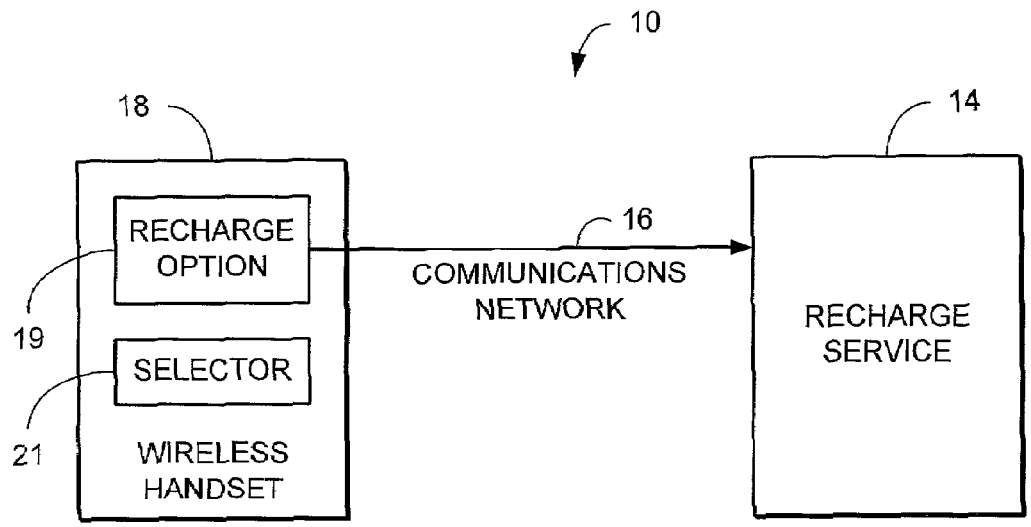
FIG. 1 is schematic view of a stored-value account recharge system according to one embodiment of the invention, showing a recharge option linking a wireless telephone device and a recharge service, the recharge option being activated by a selector.

Referring initially to FIG. 1, a recharge system according to one embodiment of the present invention is shown generally at 10. Recharge system 10 typically includes a wireless telephone device 18 having a recharge option 19 that may be activated by a selector 21, in order to initiate a recharge transaction with recharge service 14, and add calling units to a stored-value calling account associated with wireless telephone device 18, as described in more detail below.

Figure 2:
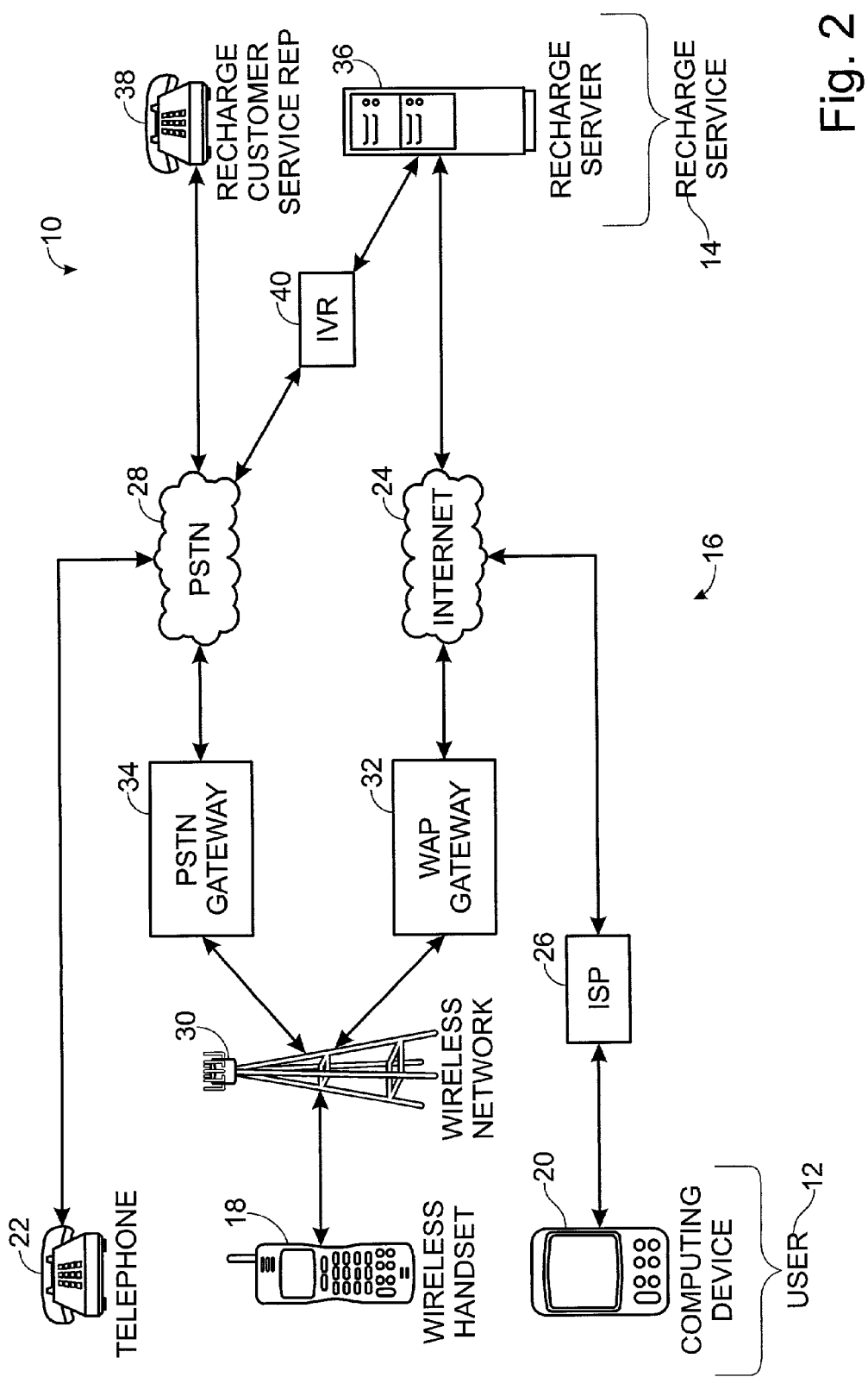
FIG. 2 is another schematic view of the system of FIG. 1, showing details of the recharge service 14 and communication network 16.

As shown in FIG. 2, wireless telephone device 18 is typically configured to communicate with recharge service 14 via communication network 16. Communication network 16 typically includes a wireless network 30, linked to Wide Area Protocol (WAP) gateway 32 and Public Switched Telephone Network (PSTN) gateway 34. Wireless network 30 may be a digital or analog cellular network, PCS network, satellite network, radio frequency network, or other wireless network. Wireless telephone 18 is configured to access Wide Area Network (WAN) 24, which is typically the Internet, via wireless network 30 and WAP gateway 32. Wireless telephone 18 is also configured to access the Public Switched Telephone Network (PSTN) 28 via PSTN gateway 34.

Recharge service 14 typically includes a recharge server 36 configured to access database records related to stored-value calling accounts, and, upon request from a user, cause calling units to be added to the user's stored-value calling account. Recharge service 14 typically includes at least three ways by which the user may request the recharge service to add calling time to an account. First, recharge service 14 typically includes a recharge website, shown at 36a in FIG. 5, that is served by recharge server 36 to wireless telephone device 18, via WAN 24. The recharge website may also be accessed by user 12 via another computing device 20, such as a laptop, desktop, or handheld computing device, connected to WAN 24 via an Internet Service Provider (ISP) 26. The recharge website typically has a link, such as recharge amount option 19g, by which the user may instruct the recharge service to add calling units to the user's stored value calling account.

Second, the recharge service typically includes an Integrated Voice Response (IVR) system 40 configured to present an automated, prerecorded voice menu of recharge options to the user in a telephone call between device 18 and IVR system 40, carried over PSTN 28. Upon selection of on of an IVR menu options, such as recharge amount option 19h shown in FIG. 5, recharge server 36 is configured to cause calling units to be added to the user's stored value calling account.

Third, the recharge service typically includes at least one Customer Service Representative (CSR) 38 configured to answer telephone calls from user 12 and present recharge options to the user. Upon selection of an option by the user, the CSR typically instructs recharge server 36 to add calling units to the user's stored value calling account. It will be appreciated that telephone calls to IVR 40 and/or CSR 38 may be placed by user 12 via wireless telephone device 18, or via another telephone 22.

Figure 4:
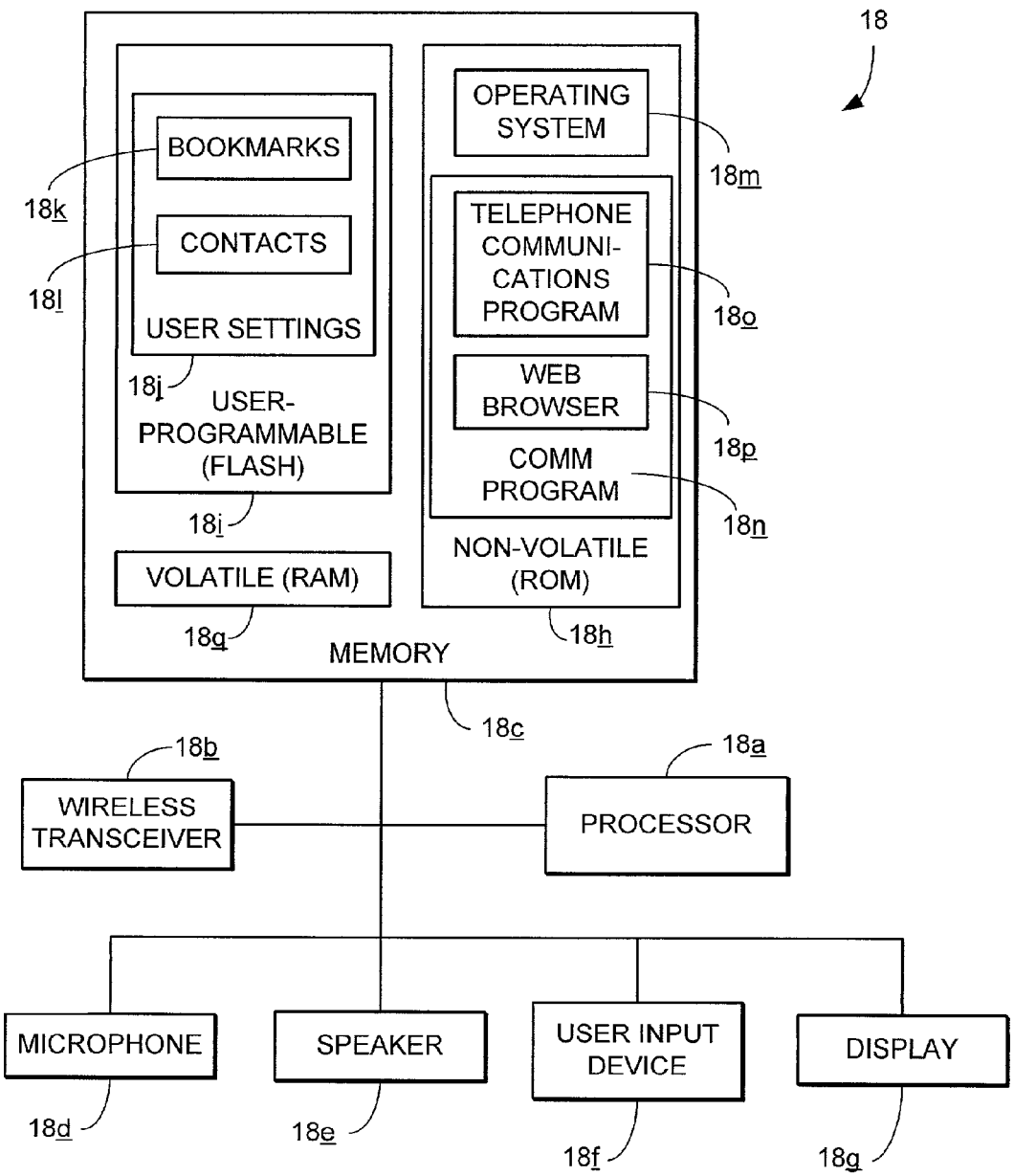
FIG. 4 is a schematic view of the wireless telephone device of FIGS. 1 and 2, according to one embodiment of the present invention.

As shown in FIG. 4, wireless telephone device 18 is typically a web-enabled wireless handset having a processor 18a, a wireless transceiver 18b configured to communicate with wireless network 30, and memory 18c. The handset further includes a speaker 18d and microphone 18e for the user to listen and speak through, as well as a user-input device 18f (typically a keyboard) and a display 18g, via which the user may dial a telephone call and otherwise interact with handset 18. While typically separate components, it will be appreciated that the user-input device and display may be combined in a touch-sensitive screen configured to both display information and receive input from the user. It will also be appreciated that processor 18a may also be configured to recognize voice commands.

Memory 18c typically includes non-volatile, preprogrammed memory 18h, such as ROM, volatile memory 18q, such as RAM, and non-volatile, user-programmable memory 18i, such as Flash memory. The non-volatile memory 18h is configured to store an operating system 18m, which includes instructions for the basic operations and user interface of handset 18, as well as communications program(s) 18n. As used herein the term "program" refers to a set of instructions interpretable by a computer, and may refer to one or more data files or executable files containing such instructions.

Communications program(s) 18n typically include a telephone communications program 18o configured to manage telephone calls placed and received through the wireless network 30, and a web browser 18p configured to download web pages from remote websites via WAP gateway 32, and present the web pages on display 18g.

User-programmable memory 18i is typically configured to store a user-programmable contact list 18l of telephone numbers, and user-programmable bookmarks 18k. As used herein, the term "bookmark" refers to a link interpretable by web browser 18p to link the user to a destination website, and the term "contact" refers to a link interpretable by telephone communications program 18o to place a call to a destination telephone number.

While wireless telephone device 18 is typically a wireless handset as shown in FIG. 4, it will be appreciated that wireless telephone device 18 also may be a telephone-equipped PDA, head-mounted wireless telephone, or other wireless telephone device.

Typically, wireless telephone 18 is associated with a stored-value calling account, the balance of which may be stored on the handset itself, or in a database associated with the telephone carrier. As the user places calls to various locations using the calling account, calling units (typically denominated in minutes) are subtracted from the current account balance. When the account is low, the user may wish to add calling units to the account, in a process referred to as recharge.

As discussed above, to recharge the stored-value calling account, the user may choose recharge option 19 by actuating selector 21 on the wireless telephone 18. In response to selection of the recharge option, the recharge option is configured to cause communication program 18n to initiate a recharge transaction with the recharge service 14 via the communication network 16, in order to add calling units to the stored-value calling account.

Figure 15:
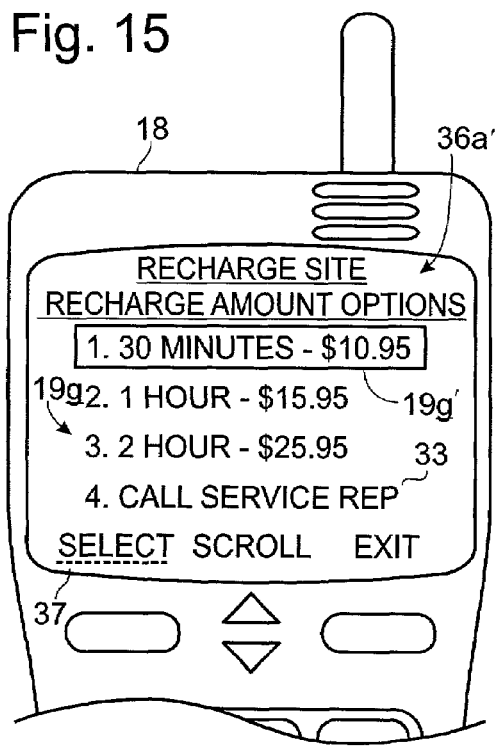
FIG. 15 is a front view of a screen of the wireless telephone of FIG. 1, showing a recharge amount options page at the recharge site.

The communication link between the wireless telephone 18 and the recharge service 14 may occur in one of two basic modes, a web-based mode or a telephone-based mode. For web-based calling account recharge, the recharge option is configured to cause the web browser 18p to contact a recharge server 36 of the recharge service via the WAN, and download a recharge web site for display on wireless telephone device 18, as shown in FIG. 15. For telephone-based calling account recharge, the recharge option is typically configured to cause the telephone communications program 18o to contact the IVR system 40 or CSR 38 of recharge service 14, via a telephone call placed over the PSTN 28.

Figure 3:
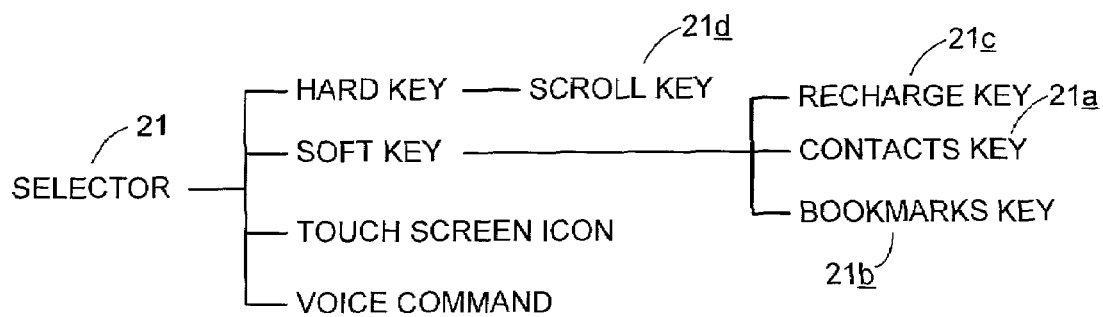
FIG. 3 is schematic view showing an exemplary hierarchy of mechanisms that may be used as the selector of FIG. 1, according to certain embodiments of the invention.

As shown in FIG. 3, selector 21 may be any one of a variety of selectors, including a hard key with a single "hard-wired" function, a soft key that changes function depending on the mode of the user interface, a touch screen graphical icon or word icon, or a voice command. One example of a hard key is the scroll key 21d, discussed below. Although the scroll key may be used to scroll through a variety of menus, its retains a single function, i.e., to scroll, and thus, for the purposes of this application, it is a "hard" key. Examples of "soft" keys include the contacts key 21a, bookmarks key 21b, and recharge key 21c, all described below.

Figure 5:
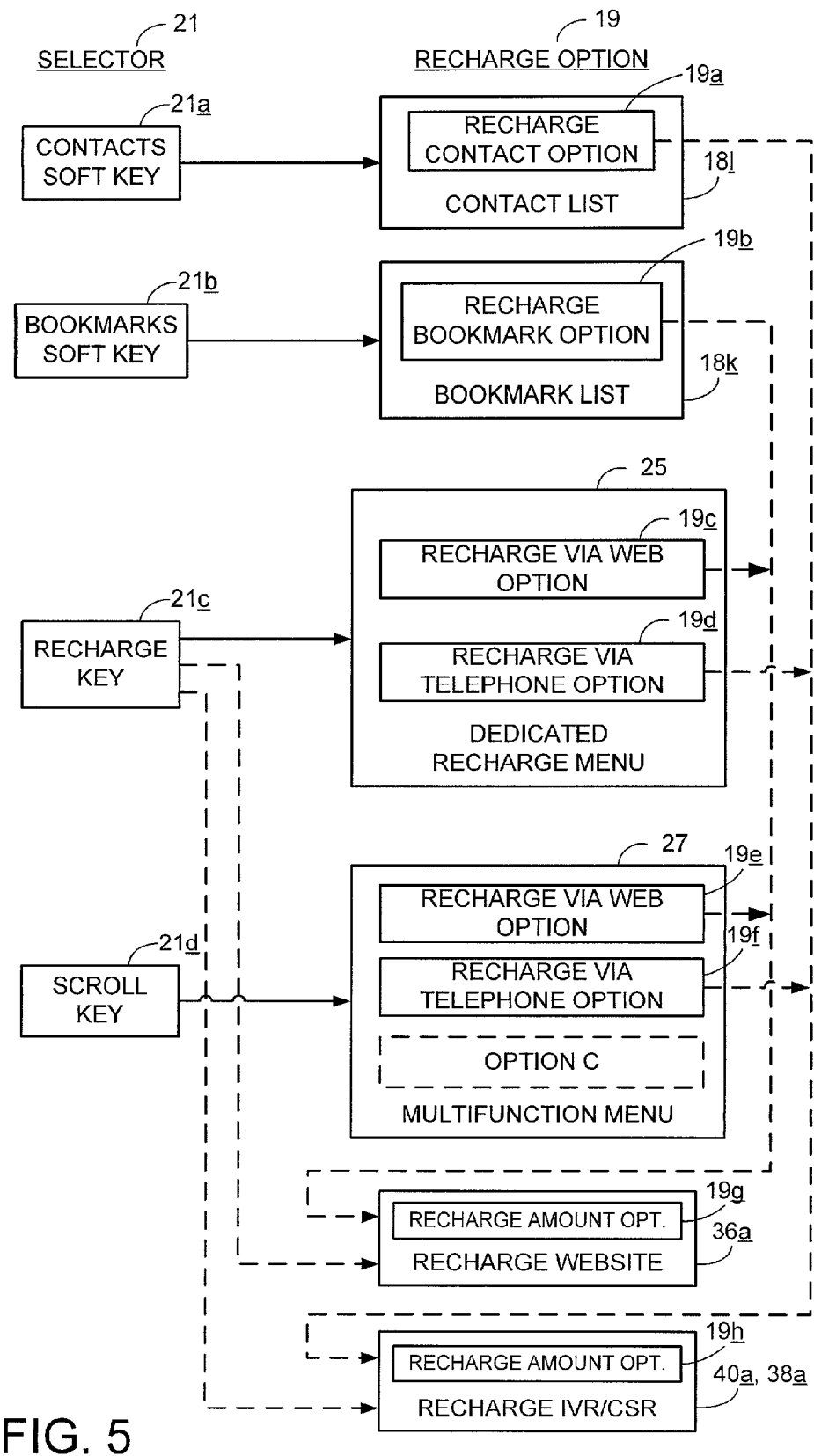
FIG. 5 is a flow diagram showing interaction between the selector and recharge option of FIG. 2.
Figure 10:
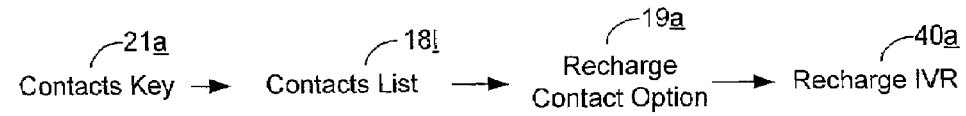
FIG. 10 is a flow diagram showing selection of a contacts list via a contacts key.

As shown in FIGS. 5 and 10, the user may select a contacts soft key selector 21a on wireless telephone device 18 to display a contact list 18l, and further may select a recharge contact option 19a from the contact list. Selection of recharge contact option 19a causes telephone communications program 18o to initiate a telephone call to recharge IVR 40, or alternatively to CSR 38. The IVR 40 and CSR 38 are each configured to present a one or more recharge amount options 19h to the user, from which the user may select a desired amount. Once selected, the recharge transaction is fulfilled, and calling units are added to the stored value calling account.

Figure 11:
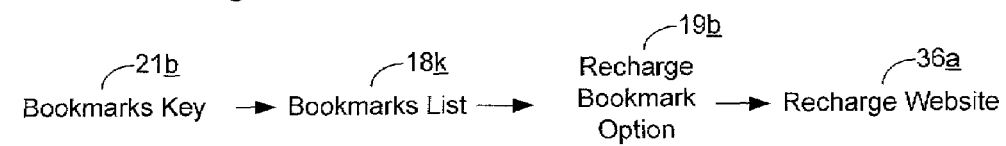
FIG. 11 is a flow diagram showing selection of a bookmarks list via a bookmarks key.

As shown in FIGS. 5 and 11, the user may select a bookmarks soft key selector 21b on wireless telephone device 18 to display a bookmark list 18k, and further may select a recharge bookmark option 19b from the bookmark list. Selection of recharge bookmark option 19b causes web browser 18p to request recharge website 36a from recharge server 36. Typically recharge website 36a includes one or more recharge amount options 19g, from which the user may select a desired amount. Once selected, the recharge transaction is fulfilled, and calling time is added to the stored value calling account.

Figure 6:
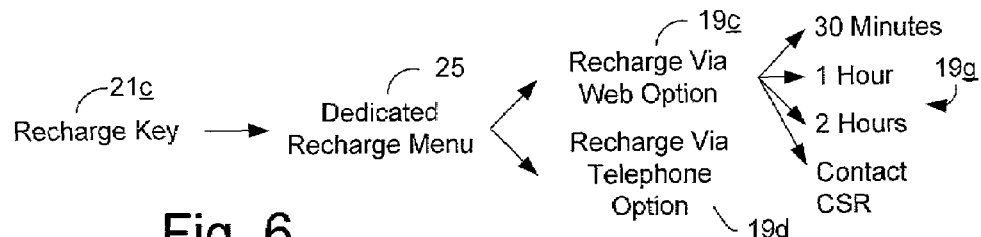
FIG. 6 is a flow diagram showing selection of a dedicated recharge menu via a recharge key.

As shown in FIGS. 5 and 6, the user may also select a recharge key 21c, which typically causes a dedicated recharge menu 25 to be displayed on display 18g of wireless telephone device 18. The dedicated recharge menu 25 typically includes recharge via web option 19c and recharge via telephone option 19d, the selection of which respectively causes the wireless telephone device 18 to connect to recharge website 36a or recharge IVR menu 40a/CSR menu 38a. Recharge website 36a includes one or more recharge amount options 19g. Similarly, recharge IVR/CSR menus 40a, 38a include one or more recharge amount options 19h. It will be appreciated that the recharge key 21c may also be configured to directly link the wireless telephone device 18 to recharge website 36a or recharge IVR/CSR menu 40a, 38a, as indicated by dashed lines in FIG. 5. Selection of recharge amount options 19g, 19h by a user causes recharge server 36 to add calling units to the user's calling account.

FIGS. 6-11 show user interaction scenarios according to various embodiments of the present invention. As shown in FIG. 6, wireless telephone device 18 may be configured such that actuation of recharge key 21c causes a dedicated recharge menu 25 to appear on display 18g.

Figure 7:
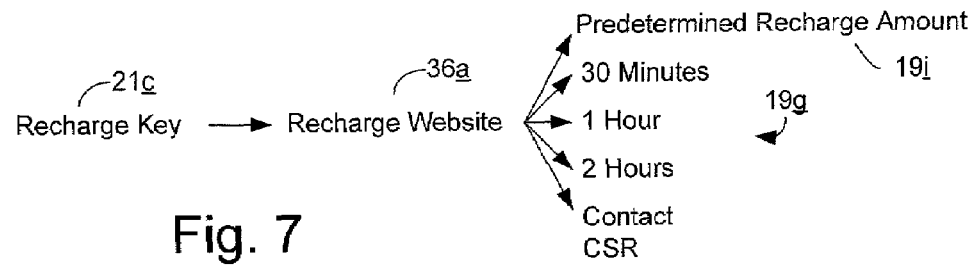
FIG. 7 is a flow diagram showing selection of a recharge website via a recharge key.

Alternatively, as shown in FIG. 7, wireless telephone device 18 may be configured such that actuation of recharge key 21c causes a recharge website 36a to appear on display 18g. While typically a plurality of recharge amount options 19g are presented to the user, it will be appreciated that the recharge option may be configured to cause the communications program to contact the recharge server 36 of recharge service 14 and add a predetermined recharge amount 19i to the stored-value calling account. To save time, the predetermined recharge amount is typically added to the calling account without further user-input, and payment for the predetermined recharge amount is billed according to information stored in a user profile on record with the recharge service.

Figure 8:
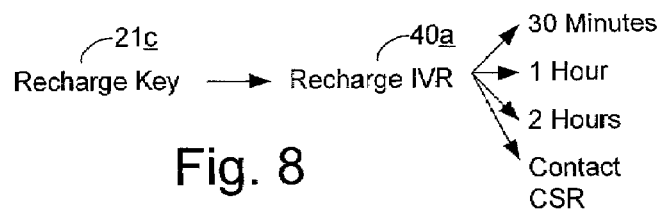
FIG. 8 is a flow diagram showing selection of a recharge IVR system via a recharge key.
Figure 9:
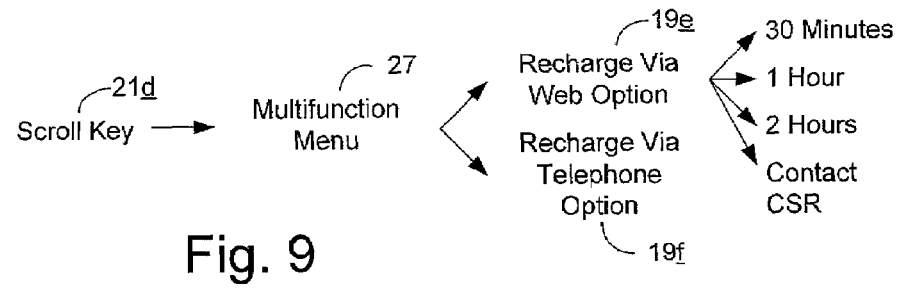
FIG. 9 is a flow diagram showing selection of a multi-function menu via a scroll key.

As yet another alternative, shown in FIG. 8, wireless telephone device 18 may be configured such that actuation of recharge key 21c causes telephone 18 to connect to recharge IVR menu 40a. As shown in FIG. 9, wireless telephone device 18 may also be configured such that actuation of a scroll key 21d causes a multifunction menu 27 to appear on display 18g. As shown in FIGS. 10 and 11, wireless telephone device 18 may be configured such that actuation of a contacts key 21a or bookmarks key 21b causes a contacts list 18l or bookmarks list 18k, respectively, to appear on display 18g.

Figure 12A:
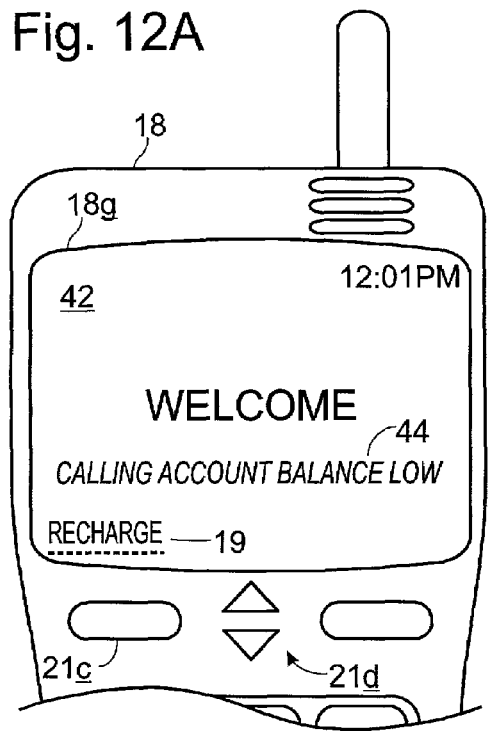
FIG. 12A is a front view of a screen of the wireless telephone of FIG. 1, showing a welcome screen, including a recharge option that leads to a dedicated recharge menu, illustrated in FIG. 13.

FIGS. 12A-18 show an exemplary user interface of wireless telephone device 18. FIG. 12A shows a start-up screen or "welcome screen" 42 of wireless device 18. Typically wireless telephone device 18 is configured to detect whether the balance of a stored-value account associated with the telephone is below a predetermined threshold value. If the balance is detected upon start up to be below the predetermined threshold, start-up screen 42 typically displays a low-balance indicator 44 in order to indicate to the user that the account balance of the stored-value calling account has dropped below the predetermined threshold. Start-up screen 42 is also typically configured to display a recharge option 19, actuatable by recharge soft key 21c. According to one embodiment of the invention, the recharge option 19 may be presented only if the account balance is below the predetermined threshold. Alternatively, the recharge option 19 may be presented each time the wireless telephone device 18 is turned on.

Figure 13:
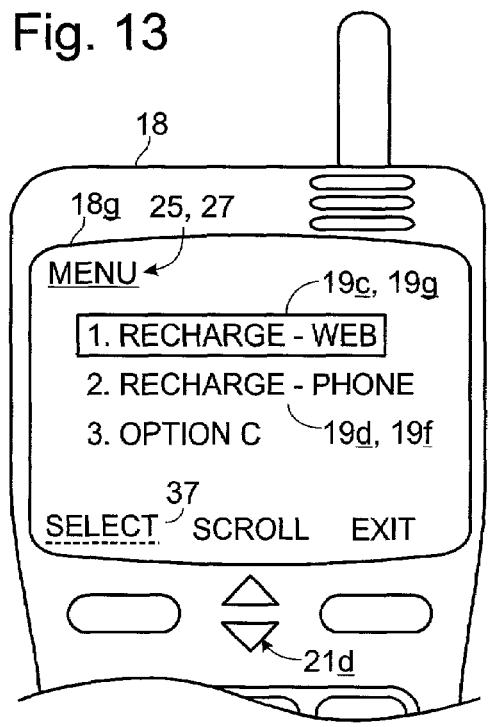
FIG. 13 is a front view of a screen of the wireless telephone of FIG. 1, showing a menu that is multifunction menu including recharge options, or alternatively a dedicated recharge menu.

Upon user actuation of recharge option 19 from start-up screen 42, wireless telephone device 18 is configured to display a dedicated recharge menu 25, as shown in FIG. 13. Typically, the dedicated recharge menu only includes menu options related to recharging the stored-value calling account associated with the wireless telephone device. Of course, one wireless telephone device 18 may have several stored-value calling accounts associated therewith, and therefore, recharge menu 25 may include options to recharge more than one account.

Figure 12B:
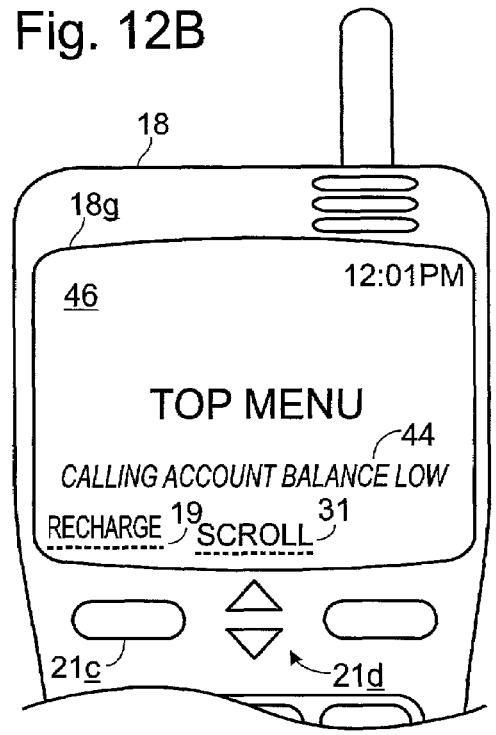
FIG. 12B is a front view of a screen of the wireless telephone of FIG. 1, showing a scroll key, which may be used to access a multifunction menu, illustrated in FIG. 13.

FIG. 12B shows a top menu 46 of wireless telephone device 18. As used herein the term "top menu" refers to the highest-level menu in the menu hierarchy of the user interface of wireless telephone 18, and is the menu displayed to the user while the device is at rest. Top menu 46 typically includes a recharge option 19 actuatable by recharge key 21c and a scroll option 31 actuatable by a scroll key 21d. Scroll key 21d nis configured to scroll through a multifunction menu, shown at 27 in FIG. 13. According to one embodiment of the invention, the user can select the recharge option 19 directly from the top menu by one touch of selector 21c, and be connected to recharge website 36a, shown in FIG. 15. This feature of the invention is referred to as "one-touch recharge" or "one-button recharge." Additionally, the user can press scroll key 21d from top menu 46 and cause multifunction menu 27 to be displayed. From multifunction menu 27, the user can select recharge by web option 19g or recharge by telephone option 19f. Because the user touches the buttons of wireless telephone device 18 twice before being connected to recharge website 36a, this feature of the invention is referred to as "two-touch recharge" or "two-button recharge."

FIG. 13 shows a recharge menu, which may be the dedicated recharge menu 25 or multifunction recharge menu 27 as discussed above. The recharge menu typically includes a recharge by web option 19c, 19g configured to connect the wireless telephone device 18 to recharge website 36a and/or a recharge by telephone option 19d, 19f configured to initiate a telephone call to LVR system 40 or CSR 38.

Figure 14:
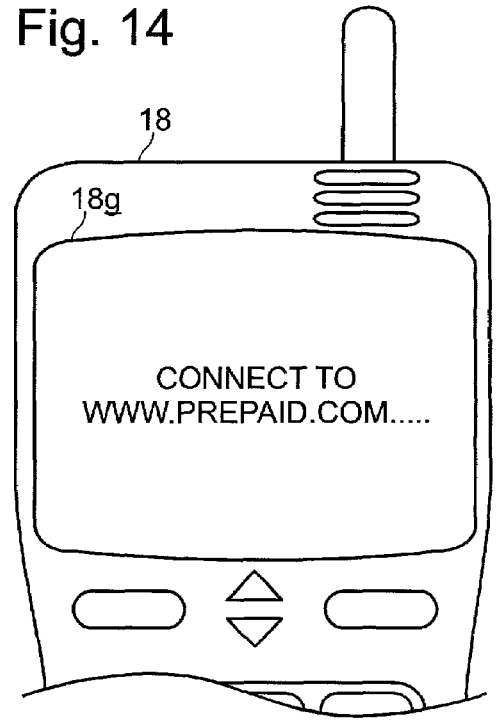
FIG. 14 is a front view of a screen of the wireless telephone of FIG. 1, showing the telephone connecting to a recharge site.

As shown in FIG. 14, upon selection of recharge by web option 19c, 19g the wireless telephone device is configured to connect to recharge server 36, in order to download a recharge amount options page 36a' of recharge website 36a. Typically, the user navigates the recharge menu 25, 27 using the scroll button and selects a desired recharge option using select key 37. The scroll and select buttons function similarly for the screens shown in FIG. 15 and 17.

Figure 18:
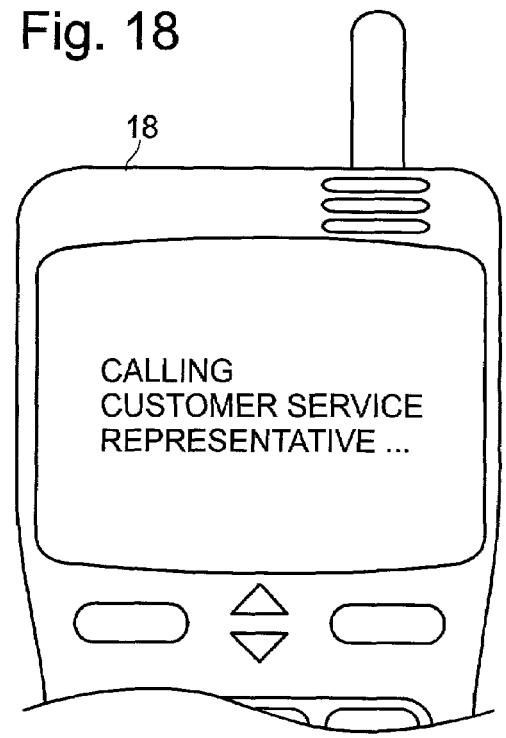
FIG. 18 is a front view of a screen of the wireless telephone of FIG. 1, showing a pending call to a customer service representative.

As shown in FIG. 15, recharge options page 36a' typically includes a plurality of recharge amount options 19g and a link 33, which upon selection, initiates a telephone call to a customer service representative 38 at the recharge service 14, as shown in FIG. 18.

Upon selection of a desired recharge amount option 19g', recharge server 36 is configured to process the recharge request and add the desired amount of time to the user's stored-value calling account. The user may be prompted by recharge server 36 to enter payment information via wireless telephone device 18, or the fee may be charged according to payment information stored in a pre-entered user profile accessible by recharge server 36.

Figure 16:
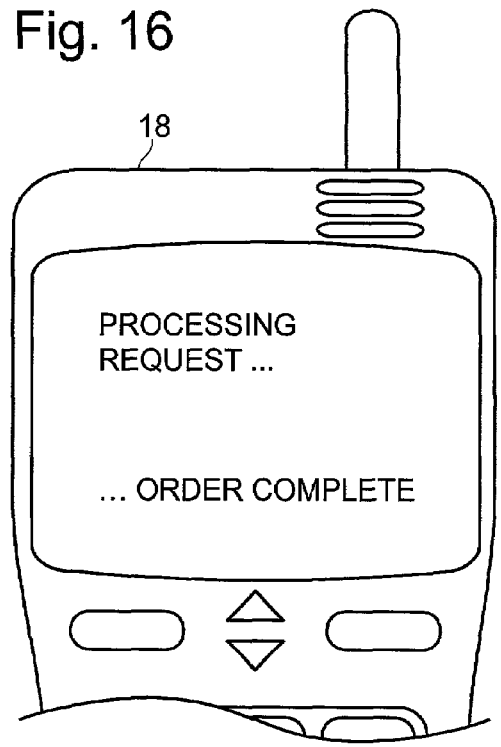
FIG. 16 is a front view of a screen of the wireless telephone of FIG. 1, showing a recharge pending transaction.
Figure 17:
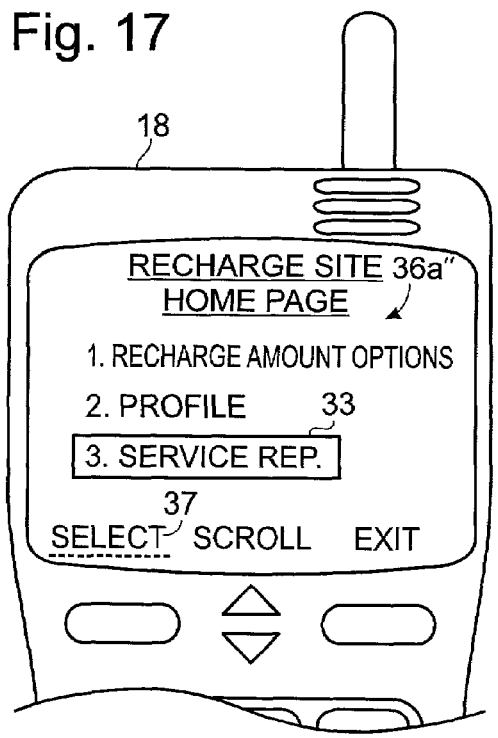
FIG. 17 is a front view of a screen of the wireless telephone of FIG. 1, showing a recharge site home page, with an option to contact a customer service representative.

Once the transaction has been completed, an order completion message may sent by recharge server 36 for display to the user, as shown in FIG. 16. After the recharge transaction, the user is typically returned to a home page 36a" of the recharge site 36a, as shown in FIG. 17. The home page typically includes a link to recharge options page 36a', a link configured to enable a user to edit a user profile, and a link 33 to contact a customer service representative. The user profile typically contains (1) payment information such as a payment number, (2) stored-value calling account information such as the account number, balance, and PIN, (3) wireless telephone device information such as the wireless telephone number, (4) a predetermined recharge amount 19i (if any) that the user would like to be automatically added to the user's account upon selection of a recharge option the user's telephone device.

Figure 19B:
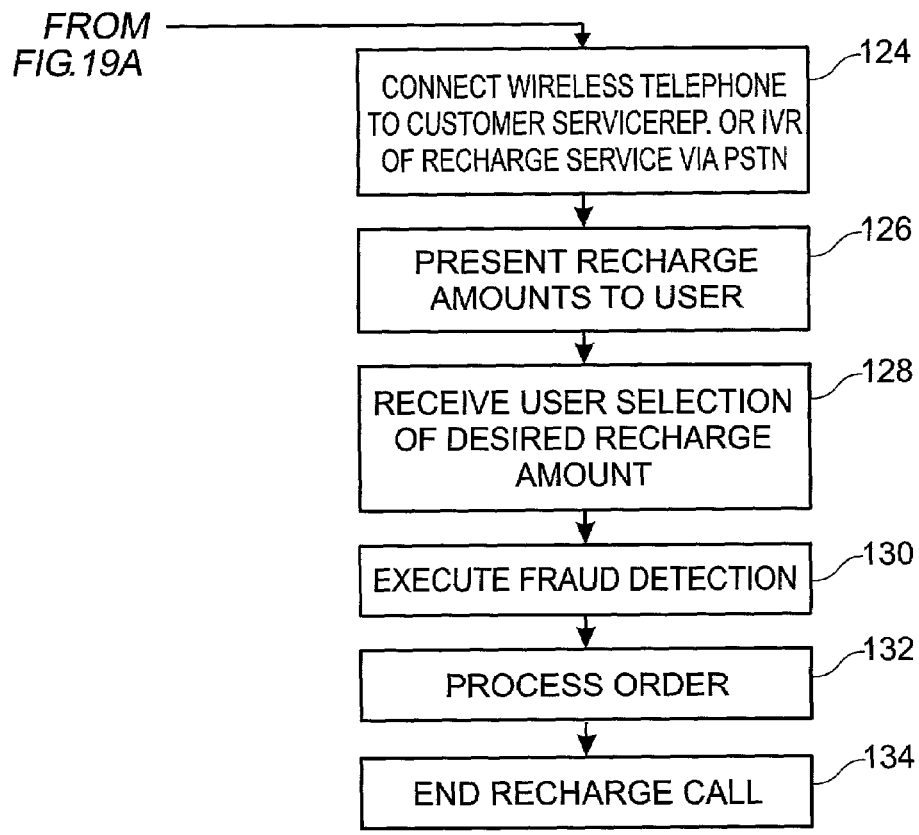
FIG. 19B is a continuation of the flowchart of the method of FIG. 19A, showing a telephone-based recharge transaction.

Turning now to FIGS. 19A and 19B, a method according to one embodiment of the present invention is shown generally at 100. Method 100 typically includes, at 102, installing a recharge option 19 on a wireless telephone device 18 having an associated stored-value calling account. Typically, the recharge option 19 is a contact entry 19a, bookmark entry 19b, recharge by web option 19c, 19e, or a recharge by telephone option 19d, 19f, as described above, and is actuatable by a selector 21 on the device. It will be appreciated that the recharge option may alternatively take a wide variety of other forms. Typically the recharge option is selectable by a user by at most one touch, or alternatively by at most two touches from the top menu of the wireless telephone device.

At 104, the method typically includes the user turning on the wireless telephone device 18. At 106, the method typically includes detecting that a stored-value calling account balance is below a predetermined threshold, and displaying an indicator 44 to indicate the low balance to the user, as shown in FIGS. 12A and 12B. At 108, the method typically includes displaying a recharge option 19 on the wireless telephone device. The recharge option may be displayed upon start-up, in a top menu of the wireless device, as an option in a multifunction menu, as an option in a dedicated recharge menu, as a bookmark, as a contact, or in another suitable manner, as discussed above.

At 110, the method typically includes receiving a user selection of a recharge option. Typically the recharge option is for web-based recharge, in which case the method proceeds to step 112, or is for telephone-based recharge, in which case the method proceeds to step 124 in FIG. 19B. These two options may be selected by recharge by web option 19c, 19g, and recharge by telephone 19d, 19e, respectively, as shown in FIG. 13.

At 112, the method typically includes connecting the wireless telephone device 18 to recharge server 36 via WAP gateway 32 and WAN 24, which is typically the Internet. At 114, the method typically includes downloading a recharge site 36a from recharge server 36 and displaying the site on display 18g of wireless telephone device 18, as shown in FIG. 15.

At 116, the method typically includes receiving a user selection of a recharge amount, typically by user selection of recharge amount option 19g or 19h, as shown in FIGS. 5 and 15. At 118, the method typically includes applying fraud detection measures to the user's order. Exemplary fraud detection measures are described in U.S. Pat. No. 6,516,056, entitled "Fraud Prevention System and Method," the disclosure of which is herein incorporated by reference.

For example, such fraud detection measures may be applied in association with a payment account that a user may desire to use to pay for a recharge option. An exemplary method of fraud detection may thus include receiving a payment account designator, such as a credit card number, from the user. Optionally, as mentioned above, such information may be stored in a user profile on record with the recharge service. The fraud detection method may further include assessing a risk level of the transaction, by identifying any fraud indicators associated with the payment account. Such fraud indicators may relate to past transactions, such as authorization failures, mismatches between information provided by the user and that provided by an authorization server, excessive order history, chargebacks, or may relate to the pending transaction, such as whether the call is placed from a high-risk area and/or an area other than that associated with the payment account, and so forth. Such fraud indicators may be detected by receiving information from the user, querying records stored in a database that contains customer and/or payment accounts records, requesting information from an authorization server and/or the issuer of the payment account, and so forth.

A risk level for the recharge option transaction may be determined, or assessed, by assigning each identified fraud indicator a value, such as according to a predetermined weighted system or other value assigning system. The exemplary method may continue by determining whether the assessed risk level meets or exceeds a predetermined threshold. If the assessed risk level does not meet or exceed a predetermined threshold, then the recharge option transaction may proceed to fulfillment after completing any necessary authorization steps (for example, verifying with an authorization server and/or an issuer that there are sufficient funds or credit associated with the payment account to authorize the transaction). If the assessed risk level meets or exceeds a predetermined threshold, the order may be reviewed by a fraud clerk or other customer service personnel, and fulfillment of the order may be deferred until (or unless) the order is verified by such personnel. Order verification may be obtained, for example, by contacting the issuer of the payment account and determining whether information given by the user matches that in the issuer's records. The user then may be contacted, either to verify the order, if there is a match, or to collect further information, if there is a mismatch. The method may include repeated checking of information given by the user, until a fraud clerk determines whether or not the order should be verified. If the order is verified, the method may conclude by fulfilling the order, such as by completing the recharge transaction. If an order is not verified, the method may include canceling the order.

Thus, as mentioned in the exemplary fraud detection method described above, if there is a problem in fraud detections the user may be transferred to a customer service representative. In addition, at virtually any other time during the recharge process, the user may select a "call to service representative" option 33 from the recharge home page 36a" or recharge amount options page 36a'. This option will place a call via the PSTN from wireless handset 18 to customer service representative 38.

At 120, the method typically includes processing the order by adding time to the account, as shown in FIG. 16. The account balance may be stored in software on wireless telephone 18, in a database located at the recharge service, at a third party carrier or elsewhere. At 122, the method returns the user to the recharge site home page 36a", shown in FIG. 17.

After step 110, the method may also include the user selecting "recharge via telephone" option 19d, 19f from menu 25, 27, as shown in FIG. 13. Upon such selection, the method typically includes, at 124, connecting wireless telephone device 18 to a CSR 38 or IVR system 40 via PSTN 28. A screen showing the pending connection is illustrated in FIG. 18.

At 126, the method further includes presenting recharge amount options 19h to the user, either via CSR 38 or IVR 40. At 130, the method includes receiving a user selected recharge amount option. The user may key in the option to a telephone keypad of wireless telephone 18, or may speak the selected option, which will be recognized by a voice recognition software module within IVR 40. At 130, the method further includes applying fraud detection measures, as discussed above in step 118. If no fraud is detected, then the method includes processing the order at 132, which is accomplished in a similar manner to step 120 described above. After the order is processed, the call is ended at 134.

Figure 20:
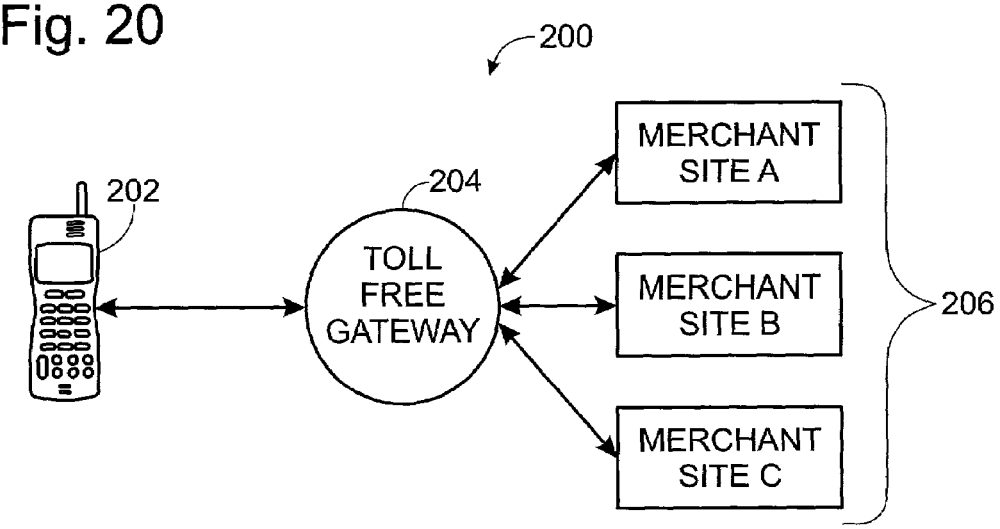
FIG. 20 is a schematic view of a toll free access system according to another embodiment of the present invention.

Turning now to FIG. 20 a toll free access system is shown generally at 200. Toll free access system 200 typically includes a wireless handset 202, a toll free gateway 204, and a plurality of web sites 206. Typically, web sites 206 are merchant sites at which the user may purchase goods and/or services. Typically, toll free gateway 204 is located at a predetermined, provisioned telephone number that users of wireless handset 202 may access, free of charge. A web page is served from a server located at toll free gateway 204 to telephone 202, featuring a list of remote web sites 206. Prior web enabled telephones have been configured to access the Internet on a metered basis. That is, typically the user has been charged for each minute of "connect time" during which wireless telephone 18 is connected to the Internet via wireless network 30. In contrast, gateway 204 is configured for toll free access. The user does not incur any long distance or per minute wireless access charges to call the gateway 204. Thus, the user may access the gateway, and the various web sites 206 linked thereto, without incurring any wireless access or long distance charges. Thus, even when user's prepaid calling account has a zero balance, the user is able to call gateway 204 and shop at merchant web sites 206. Typically, the user's telephone carrier has configured its telephone switches to detect when the user dials the predetermined telephone number of the gateway 204, and prevent connect time access charges from being applied to the call. The present system has the advantage that users are not charged for shopping at merchant sites 206. Thus, users may spend more time shopping at these sites free of charge, and make more purchases, thereby benefiting both the consumer and the merchant.

It will be appreciated that the toll-free gateway 204 may be implemented in system 10, in order to provide wireless telephone device 18 toll-free access to the communication network 16 when communicating with the recharge service. In this case the communication program is typically configured to initiate a web-based or telephonebased recharge transaction by sending an accompanying signal to the communication network that the recharge web access or telephone call should be toll free, and the communication network is configured to respond by routing the call in a toll-free manner. In this scenario, recharge service 14 is one of the merchant sites A-C.

The above described embodiments of the present invention may be used by a wireless telephone device user to recharge a stored-value calling account associated with a wireless telephone device, in a more convenient and efficient manner than prior recharge systems.

While the present invention has been particularly shown and described with reference to the foregoing preferred embodiments, those skilled in the art will understand that many variations may be made therein without departing from the spirit and scope of the invention. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

We claim:

1. A wireless telephone device having an associated stored-value calling account, the wireless telephone device comprising:
   a selector;
   a communications program configured to communicate with a recharge service via a communication network; and
   a recharge option selectable by a user upon actuation of the selector, the recharge option being configured to cause the communications program to contact a recharge server of the recharge service and add a predetermined recharge amount to the stored-value calling account, and to initiate both a connection to the communication network and a recharge transaction with the recharge service via the communication network, in order to add calling units to the stored-value calling account.

2. The wireless telephone device of claim 1, wherein the predetermined recharge amount is added to the calling account without further user input.

3. The wireless telephone device of claim 1, wherein the fee for the predetermined recharge amount is billed according to information stored in a user profile on record with the recharge service.

4. A wireless telephone device having an associated stored-value calling account, the wireless telephone device comprising:
   a selector;
   a communications program configured to communicate with a recharge service via a communication network, the communications program including a telephone communications program and the communication network including the PSTN, and
   a recharge option selectable by a user upon actuation of the selector, the recharge option being configured to cause the communications program to contact a recharge server of the recharge service and to add a predetermined recharge amount to the stored-value calling account and to initiate both a connection to the communication network and a recharge transaction with the recharge service via the communication network, in order to add calling units to the stored-value calling account;
   wherein the recharge option is an entry in a contacts list, the entry, upon selection, being configured to cause the telephone communications program to initiate a telephone call to the recharge service.

5. A wireless telephone device having an associated stored-value calling account, the wireless telephone device comprising:
   a selector;
   a communications program configured to communicate with a recharge service via a communication network; and
   a recharge option selectable by a user upon actuation of the selector, the recharge option being configured to cause the communications program to contact a recharge server of the recharge service and to add a predetermined recharge amount to the stored-value calling account and to initiate both a connection to the communication network and a recharge transaction with the recharge service via the communication network, in order to add calling units to the stored-value calling account;
   wherein the communication program is configured to access a toll-free gateway in the communication network when communicating with the recharge service.

6. A method of recharging a stored-value calling account, comprising:
   installing a recharge option in a wireless telephone device, the recharge option being configured to initiate a recharge transaction, in order to add calling units to a stored-value calling account associated with the wireless telephone device;
   displaying the recharge option on the wireless telephone device;
   receiving a user selection of the recharge option;
   in response to the received user selection of the recharge option, contacting a recharge server of a recharge service and adding a predetermined recharge amount to the stored-value calling account, and both establishing a connection to a communication network and initiating the recharge transaction;
   receiving information relating to a payment account for paying for the user-selected recharge option; and
   applying fraud detection measures in association with the payment account, including assessing a risk level of the transaction by identifying any fraud indicators associated with the payment account, and determining whether the assessed risk level meets or exceeds a predetermined threshold.

7. A method of recharging a stored-value calling account, comprising:
   installing a recharge option in a wireless telephone device, the recharge option being configured to initiate a recharge transaction, in order to add calling units to a stored-value calling account associated with the wireless telephone device;
   displaying the recharge option on the wireless telephone device;
   receiving a user selection of the recharge option;
   in response to the received user selection of the recharge option, contacting a recharge server of a recharge service and adding a predetermined recharge amount to the stored-value calling account, and bath establishing a connection to a communication network at least partially via a toll-free gateway on the communication network; and initiating the recharge transaction.

8. A method of recharging a stored-value calling account, comprising:
   installing a recharge option in a wireless telephone device, the recharge option being configured to initiate a recharge transaction, in order to add calling units to a stored-value calling account associated with the wireless telephone device;
   displaying the recharge option on the wireless telephone device;

receiving a user selection of the recharge option;
in response to the received laser selection of the recharge option, contacting a recharge server of a recharge service and adding a predetermined recharge amount to stored-value calling account;
establishing a connection to a communication network;
initiating the recharge transaction;
receiving information relating to a payment account for paying for the user-selected recharge option; and
applying fraud detection measures in association with the payment account, including assessing a risk level of the transaction by identifying any fraud indicators associated with the payment account, and determining whether the assessed risk level meets or exceeds a predetermined threshold.

* * * * *

UNITED STATES PATENT AND TRADEMARK OFFICE
CERTIFICATE OF CORRECTION

PATENT NO. : 7,242,922 B2  Page 1 of 1
APPLICATION NO. : 10/032900
DATED : July 10, 2007
INVENTOR(S) : Fieldhouse et al.

It is certified that error appears in the above-identified patent and that said Letters Patent is hereby corrected as shown below:

Col. 9, line 37,  change "detections" to --detection,--.
Col. 10, line 59,  change "telephonebased" to --telephone-based--.

Col. 12, line 55 (Claim 7)  change "bath" to --both--.
Col. 13, line 2 (Claim 8)  change "laser" to --user--.

Signed and Sealed this

Fourteenth Day of April, 2009

JOHN DOLL
*Acting Director of the United States Patent and Trademark Office*